US008734931B2

(12) United States Patent
Seth et al.

(10) Patent No.: US 8,734,931 B2
(45) Date of Patent: May 27, 2014

(54) AEROGEL COMPOSITES

(75) Inventors: Jayshree Seth, Woodbury, MN (US);
Bryan C. Feisel, Hudson, WI (US);
Neeraj Sharma, Woodbury, MN (US);
Lian S. Tan, Woodbury, MN (US);
Grant F. Tiefenbruck, Cottage Grove, MN (US); Jung-Sheng Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 376 days.

(21) Appl. No.: 11/781,635

(22) Filed: Jul. 23, 2007

(65) Prior Publication Data
US 2009/0029109 A1 Jan. 29, 2009

(51) Int. Cl.
*B32B 1/00* (2006.01)
*B32B 3/28* (2006.01)
*B32B 3/30* (2006.01)
*B32B 3/12* (2006.01)

(52) U.S. Cl.
USPC .......... 428/172; 428/166; 428/178; 428/182; 428/186

(58) Field of Classification Search
USPC .......... 442/120–121, 136; 428/103, 159, 117, 428/182, 317.9, 178, 167, 166, 186, 72, 428/172; 181/288, 290, 294; 261/112.2; 210/510.1; 52/793.1
See application file for complete search history.

(56) References Cited

U.S. PATENT DOCUMENTS

| 3,122,520 | A |   | 2/1964  | Lentz |
| 4,081,582 | A | * | 3/1978  | Butterworth et al. ......... 442/387 |
| 4,608,361 | A |   | 8/1986  | Kanamori et al. |
| 4,609,581 | A |   | 9/1986  | Ott |
| 4,629,652 | A | * | 12/1986 | Carlson et al. ............. 428/304.4 |
| 4,770,917 | A |   | 9/1988  | Tochacek et al. |
| 5,122,291 | A |   | 6/1992  | Wolff et al. |
| 5,256,231 | A |   | 10/1993 | Gorman et al. |
| 5,306,555 | A |   | 4/1994  | Ramamurthi et al. |
| 5,470,802 | A |   | 11/1995 | Gnade et al. |
| 5,505,769 | A | * | 4/1996  | Dinnage et al. ................. 96/153 |
| 5,565,142 | A |   | 10/1996 | Deshpande et al. |

(Continued)

FOREIGN PATENT DOCUMENTS

| DE | 10113425 | 10/2002 |
| EP | 0341993 B1 | 8/1993 |

(Continued)

OTHER PUBLICATIONS

Lewis, Richard J., Sr. (2002). Hawley's Condensed Chemical Dictionary (14th Edition).. John Wiley & Sons. Online version available at: http://knovel.com/web/portal/browse/display?_EXT_KNOVEL_DISPLAY_bookid=704&VerticalID=0 Properties of Nylon, Accessed Aug. 13, 2009.*

(Continued)

*Primary Examiner* — Catherine A Simone
(74) *Attorney, Agent, or Firm* — Christopher M. Geise; Dena M. Ehrich; Adrian L. Pishko

(57) ABSTRACT

Aerogel composites and bonded aerogel composites are described. The aerogel composites include monolithic aerogel material located in cavities between a base layer and a structured layer that is bonded to the base layer. Additional layers may be bonded to the base layer and/or the structured layer to form bonded aerogel composites.

40 Claims, 5 Drawing Sheets

(56) References Cited

U.S. PATENT DOCUMENTS

| | | | |
|---|---|---|---|
| 5,789,075 | A | 8/1998 | Frank et al. |
| 5,830,387 | A | 11/1998 | Yokogawa et al. |
| 5,888,607 | A | 3/1999 | Seth et al. |
| 5,904,703 | A | 5/1999 | Gilson |
| 5,907,793 | A * | 5/1999 | Reams .......................... 725/122 |
| 5,972,254 | A | 10/1999 | Sander |
| 5,973,015 | A | 10/1999 | Coronado et al. |
| 6,068,882 | A | 5/2000 | Ryu |
| 6,087,407 | A | 7/2000 | Coronado et al. |
| 6,159,539 | A | 12/2000 | Schwertfeger et al. |
| 6,197,270 | B1 | 3/2001 | Sonoda et al. |
| 6,294,194 | B1 | 9/2001 | Horhota et al. |
| 6,316,092 | B1 | 11/2001 | Frank et al. |
| 6,436,528 | B1 | 8/2002 | Kulper et al. |
| 6,451,146 | B1 | 9/2002 | Ganschow et al. |
| 6,470,597 | B1 | 10/2002 | Stipp |
| 6,479,416 | B1 | 11/2002 | Frank et al. |
| 6,537,935 | B1 | 3/2003 | Seth et al. |
| 6,670,402 | B1 | 12/2003 | Lee et al. |
| 6,713,584 | B1 | 3/2004 | Chisholm et al. |
| 6,729,042 | B2 | 5/2004 | Lee |
| 6,989,123 | B2 | 1/2006 | Lee et al. |
| 7,078,359 | B2 | 7/2006 | Stepanian et al. |
| 7,244,796 | B2 | 7/2007 | Chisholm et al. |
| 2001/0024692 | A1 | 9/2001 | Aronson |
| 2004/0132846 | A1 | 7/2004 | Leventis et al. |
| 2004/0142149 | A1 * | 7/2004 | Mollendorf et al. .......... 428/156 |
| 2005/0192366 | A1 | 9/2005 | Ou et al. |
| 2005/0192367 | A1 | 9/2005 | Ou et al. |
| 2006/0024133 | A1 | 2/2006 | Shiomoto et al. |
| 2006/0178496 | A1 | 8/2006 | Lin et al. |
| 2006/0269734 | A1 | 11/2006 | Krajewski et al. |
| 2006/0286360 | A1 | 12/2006 | Rhine et al. |

FOREIGN PATENT DOCUMENTS

| | | |
|---|---|---|
| EP | 0995782 | 10/1999 |
| JP | 3-213545 | 1/1990 |
| JP | 2001193183 A * | 7/2001 |
| WO | 2006/107226 | 10/2006 |
| WO | 2006/126232 | 11/2006 |
| WO | 2006/135882 | 12/2006 |
| WO | 2007/011988 A2 | 1/2007 |

OTHER PUBLICATIONS

Lewis, Richard J., Sr. (2002). Hawley's Condensed Chemical Dictionary (14th Edition).. John Wiley & Sons. Online version available at: http://knovel.com/web/portal/browse/display?_EXT_KNOVEL_DISPLAY_bookid=704&VerticalID=0 Properties of Polypropylene, Accessed Aug. 13, 2009.*
Lewis, Richard J., Sr. (2002). Hawley's Condensed Chemical Dictionary (14th Edition).. John Wiley & Sons. Online version available at: http://knovel.com/web/portal/browse/display?_EXT_KNOVEL_DISPLAY_bookid=704&VerticalID=0 Properties of Polyethylene, Accessed Aug. 13, 2009.*
Gomez-Romero, Pedro et al. (2004). Functional Hybrid Materials (6th Edition).(p. 96). Wiley-VCH.*
Teegarden, David M., Polymer Chemistry: introduction to an indispensible science, (2004) NSTA Press (p. 149-150).*
English translation of JP 2001-193183, which was published on Jul. 17, 2001.*
Bhagat et al., "Surface chemical modification of TEOS based silica aerogels synthesized by two step (acid base) sol-gel process", Applied Surface Science, vol. 252, No. 12 (2006) pp. 4289-4297.
Bhagat et al., "Textural properties of ambient pressure dried water-glass based silica aerogel beads: One day synthesis", Science Direct, Microporous and Mesoporous Materials, vol. 96, No. 1-3, Nov. 26, 2006, pp. 237-244.
Buisson et al., "Immobilization in quartz fiber felt reinforced silica aerogel improves the activity of Candida rugosa lipase in organic solvents", Journal of Molecular Catalyst: B Enzymatic, 39 (2006) pp. 77-82.
Dorcheh, A. Solemani, et al., "Silica aerogels; synthesis, properties and characterization", Journal of Materials Processing Technology, vol. 199, 2007, pp. 10-26.
Hegde, Nagaraja D. et al., "Organic modification of TEOS based silica aerogels using hexadecyltrimethoxysilane as a hydrophobic reagent", Applied Surface Science, vol. 253 (2006) pp. 1566-1572.
Meador, Mary Ann B. et al., "Cross-linking Amine-Modified Silica Aerogels with Epoxies: Mechanically Strong Lightweight Porous Materials", Chemistry of Materials, vol. 17, No. 5, Mar. 1, 2005, pp. 1085-1098.
Rao et al, "Comparative studies on the surface chemical modification of silica aerogels based on various organosilane compounds of the type RnSiX4-n", Journal of Non-Crystalline Solids, 350 (Dec. 15, 2004) pp. 216-233.
Rao et al., Effect of precursors, methylation agents and solvents on the physicochemical properties of silica aerogels prepared by atmospheric pressure drying method, Journal of Non-Crystalline Solids, 296 (2001) pp. 165-171.
Rao et al., "Surface chemical modification of silica aerogels using various alky-alkoxy/chloro silanes", Applied Surface Science, vol. 206 (2003) pp. 262-270.
Rao et al., "Synthesis of flexible silica aerogels using methyltrimethoxysilane (MTMS) precursor", Journal of Colloid and Interface Science, vol. 300 (2006) pp. 279-285.
Rao et al., "Comparative studies of the physical and hydrophobic properties of TEOS based silica aerogels using different co-precursors", Science and Technology of Advanced Materials, vol. 4, No. 6, Nov. 30, 2003, pp. 509-515.
Zhang, Xin et al., "Structural characterization of sol-gel composites using TEOS/MEMO as precursors", Surface and Coatings Technology, vol. 201, No. 12, Feb. 2, 2007, pp. 6051-6058.
Bhagat et al., "Rapid synthesis of water-glass based aerogels by in situ surface modification of the hydrogels," Applied Surface Science 253 (2007) pp. 3231-3236.
Bhagat et al., "Methyltrimethoxysilane based monolithic silica aerogels via ambient pressure drying," Microporous and Mesoporous Materials 100 (2007) pp. 350-355.
Fidalgo et al., "Hybrid Silica/Polymer Aerogels Dried at Ambient Pressure," Chem. Mater. 2007, 19, pp. 2603-2609.
Hench et al., "Gel-Silica Science," Annu. Rev. Mater. Sci. 20 (1990) pp. 269-298.
Ilharco et al., "Nanostructured silica/polymer subcritical aerogels," J. Mater. Chem:. 17, 2007, pp. 2195-2198.
Kistler, "Coherent Expanded Aerogels," Journal of Physical Chemistry. (1932) 36(1), pp. 52-64.
Leventis et al., "Nanoengineering Strong Silica Aerogels," (2002) Nano Letters, vol. 2, No. 9; pp. 957-960.
Martin et al., "Organo-modified silica aerogels and implications for material hydrophobicity and mechanical properties," J. Mater. Chem., 2008, 18, pp. 207-213.
Rao et al., "Organic Surface Modification of TEOS Based Silica Aerogels Synthesized by Co-Precursor and Derivitization Methods," Journal of Sol-Gel Science and Technology 30, 2004, pp. 141-147.
Rosa-Fox et al., "Nanoindentation on hybrid organidinorganic silica aerogels," Journal of the European Ceramic Society 27 (2007) pp. 3311-3316.
Slark et al., "Branched methacrylate copolymers from multifunctional comonomers: the effect of multifunctional monomer functionality on polymer architecture and properties," J. Mater. Chem., 2003, 13, pp. 2711-2720.
Yokogawa et al., "Hydrophobic siica aerogels," Journal of Non-Crystaline Solids 186 (1995) pp. 23-29.

* cited by examiner

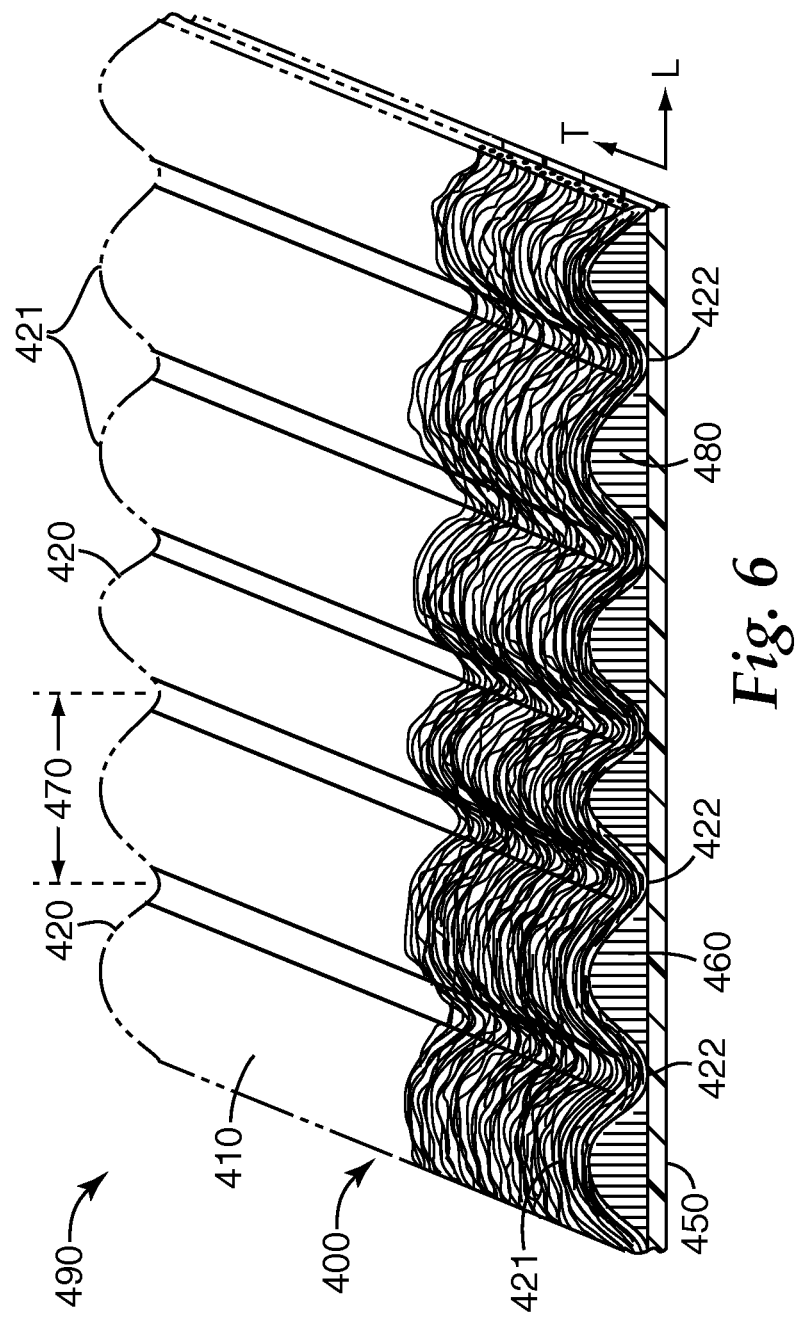

AEROGEL COMPOSITES

FIELD

The present disclosure relates to aerogel composites, including aerogel composites comprising a bonded web having cavities containing an aerogel. Methods of making aerogel composites and uses for aerogel composites are also disclosed.

BACKGROUND

Escalating energy costs and urbanization have led to increased efforts to provide more effective thermal and acoustic insulation materials for pipelines, automobiles, aerospace, military, apparel, windows, and houses as well as other equipment and appliances. Aerogels are low density, high porosity materials making them useful in many applications, e.g., as thermal and/or acoustic insulators. Aerogels may also be useful in other applications, e.g., as filtration media and catalytic supports.

SUMMARY

Briefly, in one aspect, the present disclosure provides an aerogel composite comprising a bonded web comprising a base layer and a structured layer. The structured layer comprises a plurality of troughs, and at least some of the troughs are bonded to the base layer defining cavities between the structured layer and the base layer. The aerogel composites also comprise monolithic aerogel material contained within at least some of the cavities.

In some embodiments, the base layer and/or the structured layer may be permeable; may comprise a thermoplastic material; and/or may comprise a fibrous layer (e.g., a non-woven fibrous layer). In some embodiments, a layer may comprise a foam. In some embodiments, a layer may comprise a plurality of layers.

In some embodiments, at least some of the troughs of the structured layer are melt-bonded to the base layer. In some embodiments, the aerogel composites further comprise an adhesive bonding at least some of the troughs of the structured layer to the base layer.

In some embodiments, a span of the structured layer between adjacent troughs is arcuate. In some embodiments, at least one cavity is a channel. In some embodiments, at least one cavity is a pocket.

In some embodiments, monolithic aerogel material is contained within substantially all of the cavities. In some embodiments, the monolithic aerogel material within at least one cavity comprises a fiber reinforced aerogel monolith.

In some embodiments, the aerogel material comprises an inorganic aerogel. In some embodiments, the inorganic aerogel comprises silica. In some embodiments, the aerogel material comprises an organic aerogel. In some embodiments, the aerogel material comprises an inorganic-organic hybrid aerogel. In some embodiments, the aerogel material comprises a cross-linked aerogel. In some embodiments, the aerogel material is hydrophobic. In some embodiments the aerogel material is oleophobic. In some embodiments, the aerogel material is hydrophilic.

In some embodiments, an aerogel composite further comprises aerogel material embedded within the structured layer, embedded within the base layer, on an exposed surface of the structured layer, and/or on an exposed surface of the base layer.

In some embodiments, an aerogel composite further comprises an additional layer bonded to the base layer and/or the structured layer. In some embodiments, an additional layer comprises a thermoplastic material. In some embodiments, an additional layer is melt-bonded to the base layer and/or the structured layer.

In another aspect, the present disclosure provides a stack of aerogel composites comprising two or more individual aerogel composites. In some embodiments, each individual aerogel composite comprises a bonded web comprising a base layer and a structured layer comprising a plurality of troughs, wherein at least some of the troughs are bonded to the base layer defining cavities between the structured layer and the base layer; and monolithic aerogel material contained within at least some of the cavities.

The above summary of the present disclosure is not intended to describe each embodiment of the present invention. The details of one or more embodiments of the invention are also set forth in the description below. Other features, objects, and advantages of the invention will be apparent from the description and from the claims.

BRIEF DESCRIPTION OF THE DRAWINGS

FIG. 6 illustrates an exemplary aerogel composite comprising channels according to some embodiments of the present disclosure.

DETAILED DESCRIPTION

Figure 1A:
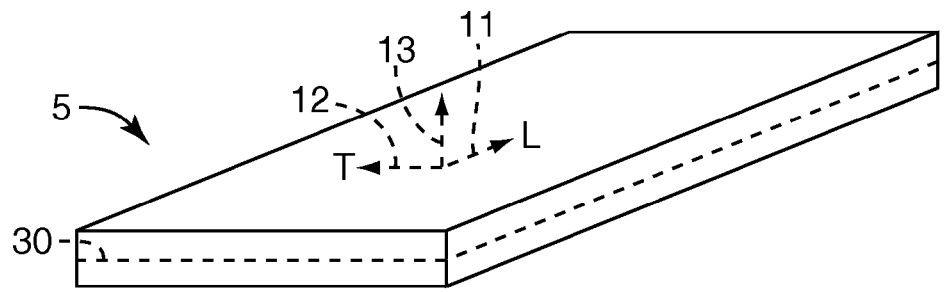
FIG. 1a illustrates a layer.

As used herein the term "aerogel" refers to a solid state substance similar to a gel except that the liquid dispersion medium has been replaced with a gas, e.g., air. In some literature, the term aerogel has also been used to describe a specific subset of such solid state substances wherein the liquid of the gel has been removed at supercritical temperatures and pressures to form the aerogel. In order to avoid confusion, such aerogels will be referred to herein as "supercritical aerogels." Other terms have been used to describe specific subsets of aerogels that have been formed by other processes such as "xerogels," which typically refers to aerogels formed at sub-critical conditions, and "cryogels". In summary, unless otherwise indicated, the term "aerogel" refers to the final product independent of the process used to arrive at the product.

An "aerogel monolith" is a unitary structure comprising a continuous aerogel. Aerogel monoliths generally provide desirable insulating properties; however, they tend to be very fragile and lack the flexibility needed for many applications. Aerogel monoliths may also shed aerogel material, which can create handling problems.

Aerogel "particulates" are a flowable, powder-like aerogel material that can be used alone or in a mixture with other materials such as resins. In some applications, the use of aerogel particulates may provide an article with greater flexibility than an aerogel monolith; however, even when compacted, an insulting layer comprising aerogel particulates often provides poorer insulation than a similar quantity of an aerogel monolith. In addition, loose aerogel particles may be difficult to handle and apply.

Aerogel composites have been used in an attempt to address some of the handling and flexibility problems associated with aerogel monoliths and aerogel particulates. Generally, an "aerogel composite" comprises both an aerogel and a reinforcing material such as fibers. Fibrous matrices include individual fibers, as well as woven and non-woven fibrous webs (e.g., lofty fibrous battings). One such aerogel composite is a fiber reinforced aerogel monolith, which comprises a fibrous matrix embedded in an aerogel monolith. As used herein, the term "monolithic aerogel" includes both aerogel monoliths and fiber reinforced aerogel monoliths.

Aerogel composites also include aerogel particulates integrated with a fibrous matrix, and, optionally, a resin. Such particulate based composites may be compacted to form, e.g., aerogel powder-fiber compacts.

Although such aerogel composites may provide improved flexibility and handle-ability compared to aerogel monoliths and loose aerogel particulates, handling problems may also arise in the use of such aerogel composites. With both structures, aerogel material may be present on the exposed surfaces of the aerogel composite. Also, if the aerogel cracks or breaks during handling or use, loose aerogel material may be formed. Both the exposed aerogel material and the loose aerogel material may be shed during the handling and application of such aerogel composites. Additional shedding may occur during the use of a product having such aerogel composites applied to it.

In addition, these aerogel composites generally show reduced insulating performance, particularly in comparison to aerogel monoliths. For example, when these aerogel composites are bent or flexed, poorly controlled voids or pores may be formed as the aerogel separates from the fibers. These pores may result in undesirable convective paths through the aerogel composite. Also, the presence of the fibers themselves can provide undesirable conductive paths through the aerogel material.

In addition to identifying these and other limitations with aerogels and aerogel composites, the present inventors developed alternative aerogel composites. Generally, the aerogel composites of the present disclosure include a bonded web and an aerogel. The bonded web comprises a structured layer intermittently bonded to a base layer forming cavities between the structured layer and the base layer. Although some aerogel may be present within either one or both of the structured layer and the base layer, at least some aerogel is contained within these cavities.

In some embodiments, the structured layer may be a porous layer including, e.g., liquid permeable layers. In some embodiments, the structured layer may comprise a fibrous layer. Exemplary fibrous layers include woven and non-woven materials, knits, scrims, screens, meshes, fabrics, battings, mats, and the like. In some embodiments, the fibrous layer may comprise individual fibers, e.g., yarns or strands. In some embodiments, the structured layer may comprise a perforated layer, e.g., a perforated polymeric film. In some embodiments, the structured layer may comprise a foam, e.g., an open cell foam or a closed cell foam.

In some embodiments, the bonded web may be a loop material, such as those typically used for hook and loop fastening systems. Loop material generally comprises a base layer and a multiplicity of loops formed from longitudinally oriented polymeric fibers bonded to the base layer. Loop materials may be made by many methods including conventional weaving or knitting techniques. Sheets of loop materials in which the loops are stitched into the base layer are described in U.S. Pat. Nos. 4,609,581 and 4,770,917.

In some embodiments, the loop material may comprise a base material comprising a thermoplastic layer with generally uniform morphology. The loop material further includes a sheet of longitudinally oriented fibers having generally non-deformed anchor portion bonded or fused to the base layer at spaced bonding locations, and arcuate spans projecting from the front surface of the base layer between bonding locations. Such loop materials and methods of making them are described in, e.g., U.S. Pat. Nos. 5,256,231; 5,888,607; and 5,904,703, incorporated herein by reference.

In some embodiments, the structured layer may be an undulated layer comprising alternating crests and troughs. Generally, at least some of the troughs are bonded to the base layer forming cavities between such an intermittently-bonded, undulated layer and the base layer.

Referring to FIG. 1a, layer 5 has first major dimension 11 and second major dimension 12, which is perpendicular to the first major dimension. The first and second major dimensions define plane 30 of layer 5 and may be selected to correspond to the longitudinal (L) and transverse (T) dimensions of the layer; although other orientations are possible. Minor dimension 13 is perpendicular to both first major dimension 11 and second major dimension 12; thus, it is perpendicular to plane 30. Minor dimension 13 relates to the thickness of the layer.

Figure 1B:
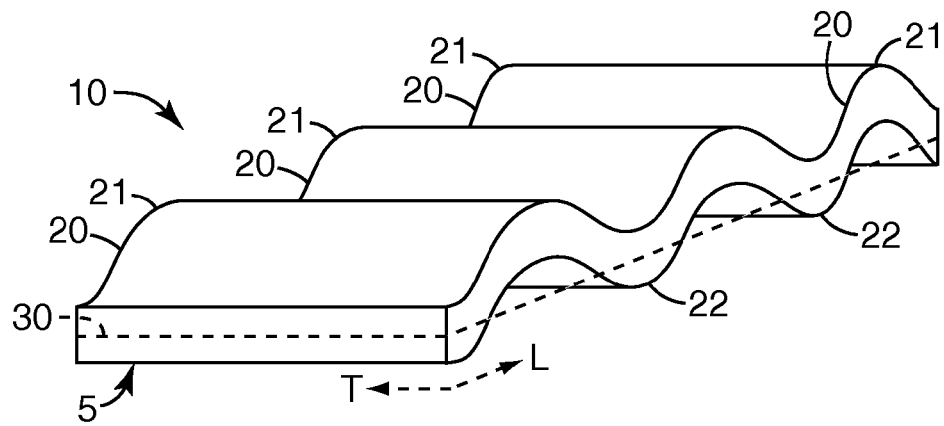
FIG. 1b illustrates the layer of FIG. 1a as a structured layer.

Referring to FIG. 1b, layer 5 has been altered from its planar state to create structured layer 10, which comprises a series of longitudinal undulations 20, each having a crest 21 and a trough 22. In the embodiment shown in FIG. 1b, the undulations are of uniform frequency, i.e., the distance between adjacent troughs is substantially constant. Because some variability is expected in the manufacture of any product, as used herein, undulations are of uniform frequency if the distance between any pair of adjacent troughs is within plus or minus 10% of the average distance between adjacent troughs.

Undulations 20 are also of uniform amplitude, i.e., the heights of crests 21 relative to plane 30, and the depths of troughs 22 relative to plane 30 are constant both in first major dimension 11 (e.g., the longitudinal dimension, L, of structured layer 10) and in second dimension 12 (e.g., the transverse dimension, T, of structured layer 10). Again, to account for routine variation, the height of a crest or the depth of a trough is constant or uniform in a particular dimension, if the height or depth varies by no more than plus or minus 10% from the average height or depth along that dimension.

In some embodiments, the structured layer may comprise variable frequency undulations. For example, in some embodiments, the distance between adjacent troughs may be varied to achieve, e.g., a desired pattern of troughs. In some embodiments, the distance between adjacent troughs may vary randomly or stochastically.

Similarly, in some embodiments, the undulations may comprise variable amplitude undulations. In some embodiments, the heights of the crests and/or the depths of the troughs may be varied to achieve desired cavity geometries. In some embodiments, the heights of the crests and/or the depths of the troughs may vary randomly or stochastically.

Figure 2:
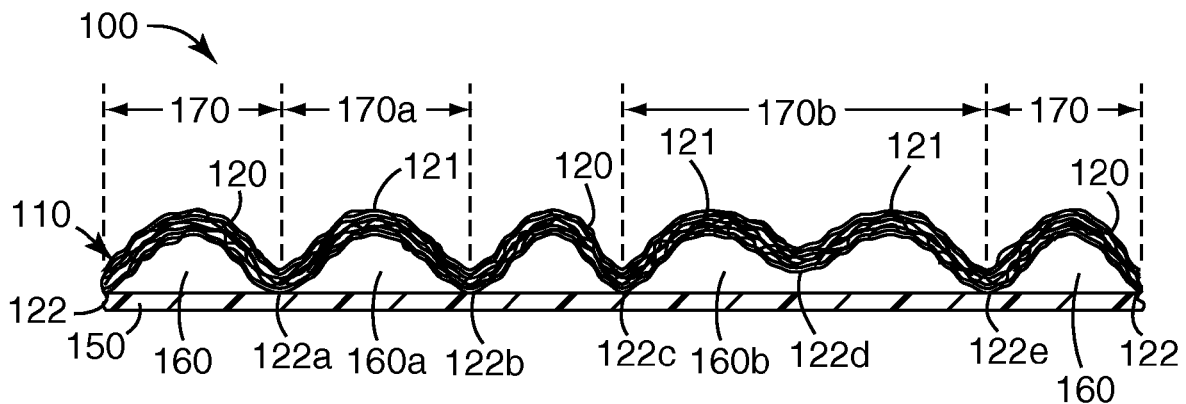
FIG. 2 illustrates a cross section of an exemplary bonded web according to some embodiments of the present disclosure.

Referring to FIG. 2, a cross section of a bonded web according to some embodiments of the present disclosure is shown. Bonded web 100 comprises structured layer 110 and base layer 150. As shown, the structured layer is a fibrous layer; however, any suitable structured layer may be used.

Structured layer 110 comprises a series of undulations 120, each having crest 121 and trough 122. At least some of the troughs of the structured layer are bonded to the base layer. In some embodiments, substantially all (i.e., at least 90%, in some embodiments, at least 95% and even at least 99%) of the troughs will be bonded to the base layer. In some embodiments, a trough will be bonded to the base layer along at least 90% of the length of the trough. In some embodiments, at least 95% and in some embodiments at least 99% of the length of a trough will be bonded to the base layer.

As shown in the embodiment of FIG. 2, troughs 122 are directly bonded to base layer 150. As used herein, a trough is "directly bonded" to the base layer if the material comprising the structured layer is in direct contact with the material comprising the base layer. In some embodiments, a direct bond arises when a trough of the structured layer is bonded to the surface of the base layer. In some embodiments, a direct bond arises when a portion of the trough is embedded in the base layer. Exemplary forms of direct bonding include melt-bonding and sonic welding.

In some embodiments, a trough may be indirectly bonded to the base layer. As used herein, a trough is "indirectly bonded" to the base layer if one or more materials are interposed between the structured layer and the base layer. For example, a trough may be indirectly bonded to the base layer via an adhesive layer.

As illustrated by trough 122d, some troughs may not be bonded to the base layer. Although not shown, such troughs may be in contact with the base layer. Unbonded troughs may occur by design, or may result from variations in the manufacturing process.

Cavities 160 are defined as the volume bounded by base layer 150 and each span 170 of structured layer 110 extending between adjacent bonded troughs. In some embodiments, adjacent bonded troughs may be adjacent troughs, as illustrated by cavity 160a, and troughs 122a and 122b. In some embodiments, adjacent bonded troughs (e.g., troughs 122c and 122e) may be separated by one more intervening unbonded troughs (e.g., unbonded trough 122d).

Cavity 160a is bounded by base layer 150 and span 170a of structured layer 110. Span 170a is a simple curve that extends between adjacent bonded troughs 122a and 122b through crest 121. Cavity 160b is bounded by base layer 150 and span 170b of structured layer 110. Span 170b is a compound curve that extends between adjacent bonded troughs 122c and 122e, passing through two crests 121 and unbonded trough 122d.

Figure 3:
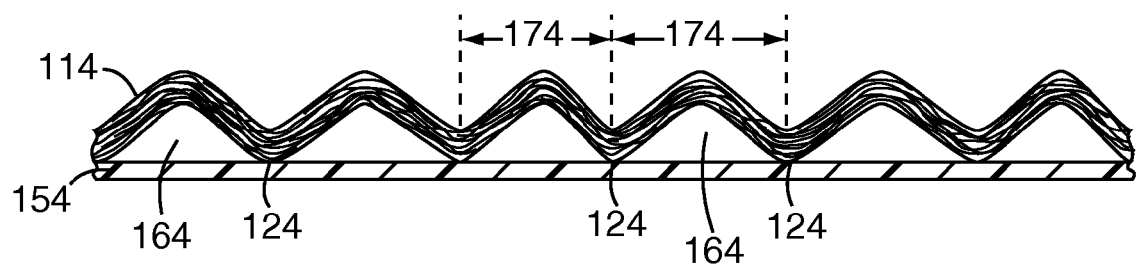
FIG. 3 illustrates a cross section of another exemplary bonded web according to some embodiments of the present disclosure.

Other geometric or irregular shapes for the span and the resulting cavity are possible. For example, referring to FIG. 3, span 174 of structured layer 114 is an inverted "V." When adjacent troughs 124 are bonded to base layer 154, the resulting cavity 164 has a generally triangular cross-section.

Figure 4:
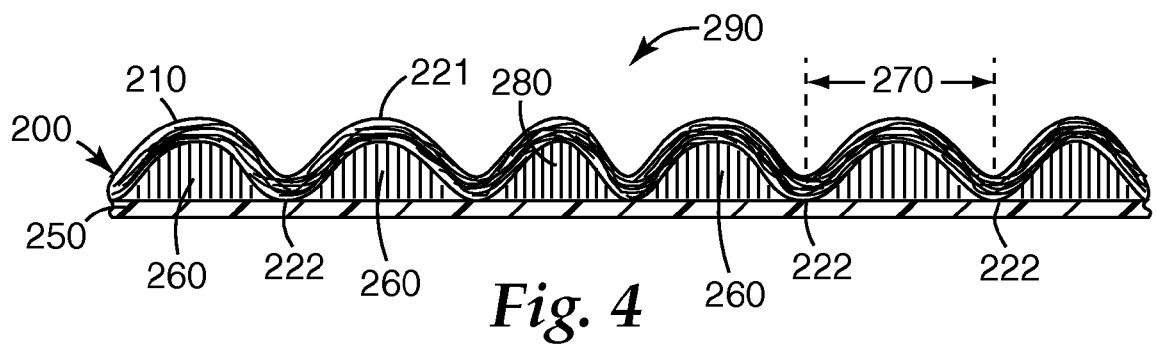
FIG. 4 illustrates a cross section of an exemplary aerogel composite according to some embodiments of the present disclosure.

Referring to FIG. 4, aerogel composite 290 comprises bonded web 200 and aerogel 280. Bonded web 200 comprises structured layer 210 bonded to base layer 250 at troughs 222. Cavities 260 are defined by base layer 250 and spans 270. Each span extends through at least one crest 221 between adjacent bonded troughs. Aerogel 280 is located within at least some of the cavities 260.

Figure 5A:
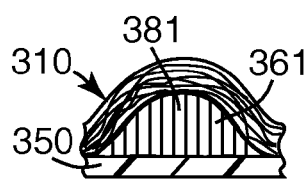
FIG. 5a illustrates a cross section of a cavity containing monolithic aerogel material according to some embodiments of the present disclosure.
Figure 5B:
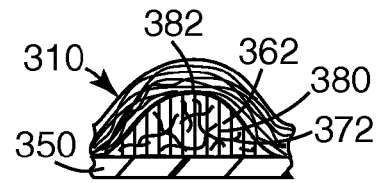
FIG. 5b illustrates a cross section of a cavity containing fiber-reinforced monolithic aerogel material according to some embodiments of the present disclosure.

Depending on, e.g., material selections and processing steps, the aerogel within the cavities can take on different forms. Referring to FIGS. 5a and 5b, cross-sections of various aerogel composites according to some embodiments of the present disclosure are shown. In each of these figures, a cavity is formed between base layer 350 and structured layer 310.

Referring to FIG. 5a, in some embodiments, the aerogel within cavity 361 is aerogel monolith 381. Referring to FIG. 5b, in some embodiments, the aerogel within, e.g., cavity 362, may be fiber reinforced aerogel monolith 382, i.e., a monolith comprising both aerogel 380 and embedded reinforcing material (e.g., fibers) 372.

In some embodiments, the aerogel material (e.g., aerogel monolith 381 or fiber reinforced aerogel monolith 382) fills at least 25%, in some embodiments, at least 50%, or even at least 75% of the cross section of the cavity. In some embodiments, the aerogel material fills substantially all (i.e., at least 90%, in some embodiments, at least 95, and even at least 99%) of the cross-section of cavity.

In some embodiments, the cavities may be channels. As used herein, a "channel" is a cavity that is bounded by the base layer and a span of the structured layer extending between two adjacent, non-intersecting bond lines. A "bond line" is defined as the bonded region between a bonded trough and the base layer. A bond line may be linear or non-linear. For example, in some embodiments, adjacent bond lines may be parallel lines. In some embodiments, adjacent bond lines may be adjacent undulating, e.g., sinusoidal, lines. In some embodiments, adjacent bond lines may be concentric circles.

Referring to FIG. 6, aerogel composite 490 comprises structured layer 410 and base layer 450. Structured layer 410 comprises undulations 420 comprising crests 421 and troughs 422, which alternate in the longitudinal dimension, L, of aerogel composite 490. At least some of the troughs are bonded to the base layer. Span 470 extends longitudinally between adjacent bonded troughs creating cavities 460 between structured layer 410 and base layer 450. Cavities 460 are channels extending between adjacent bonded troughs along the entire transverse dimension, T, of aerogel composite 490.

Aerogel material, e.g., aerogel monolith 480 or a fiber reinforced aerogel monolith, is contained within the channels. In some embodiments, a single aerogel monolith or fiber reinforced aerogel monolith extends at least 25%, in some embodiments, at least 50%, and, in some embodiments, at least 75% of the transverse length of a channel cavity. In some embodiments, a single aerogel monolith or fiber reinforced aerogel monolith extends substantially the entire transverse length of the cavity, i.e., at least 90%, in some embodiments, at least 95%, and even at least 99% of the transverse length of the cavity. In some embodiments, two or more distinct aerogel monoliths or fiber reinforced aerogel monoliths may be present within a single cavity.

In some embodiments, the cavities may be pockets. As used herein, a "pocket" is a cavity that is bounded by the base layer and a span of the structured layer extending between three or more intersecting bond lines defining an enclosed area.

Figure 7:
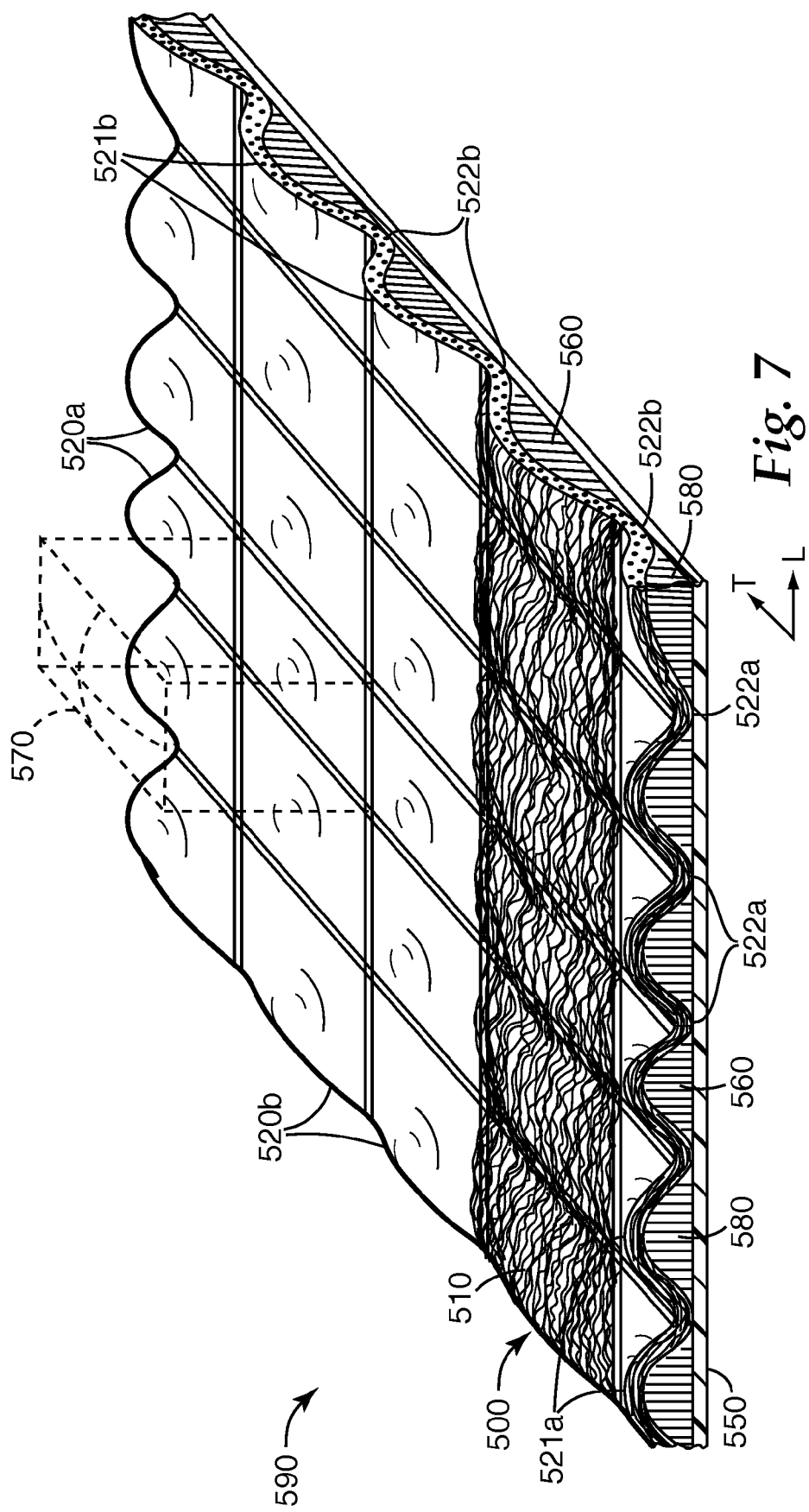
FIG. 7 illustrates an exemplary aerogel composite comprising pockets according to some embodiments of the present disclosure.

Referring to FIG. 7, aerogel composite 590 comprises structured layer 510 and base layer 550. Structured layer 510 comprises both longitudinal undulations 520a, and transverse undulations 520b. Longitudinal undulations 520a comprise longitudinal crests 521a and longitudinal troughs 522a, which alternate in the longitudinal dimension, L, of aerogel composite 590. Transverse undulations 520b comprise transverse crests 521b and transverse troughs 522b, which alternate in the transverse dimension, T, of aerogel composite 590.

At least some of both the longitudinal troughs and the transverse troughs are bonded to the base layer. Two-dimensional span 570 extends longitudinally between adjacent bonded longitudinal troughs, and transversely between adjacent bonded transverse troughs creating cavities 560 between structured layer 510 and base layer 550. Cavities 560 are pockets extending between these intersecting adjacent bonded troughs. In some embodiments, adjacent bonded troughs may not be adjacent troughs, i.e., one or more unbonded troughs may be present between a pair of adjacent bonded troughs.

In FIG. 7, longitudinal troughs 522a and transverse troughs 522b are depicted as linear and perpendicular to one another. The resulting area between the intersecting bonded troughs defines 560 that are substantially square, pillow-like pockets. In some embodiments, one or both troughs may be nonlinear. In some embodiments, the bonded troughs may intersect at angles other than 90 degrees. In some embodiments, a pattern of bonded troughs between the structured layer and the base layer may be selected to provide desired sizes and shapes for the pockets. The sizes and shapes may be uniform or non-uniform. In some embodiments, the area between the intersecting bonded troughs defining a pocket may be geometric (e.g., polygonal (e.g., square, rectangular, or triangular), circular (including ovals and the like)), or irregular.

Generally, at least some of the pockets contain aerogel material, e.g., aerogel monolith 580, or a fiber reinforced aerogel monolith. In some embodiments, substantially all (e.g., at least 90%, in some embodiments, at least 95%, and in some embodiments, at least 99%) of the pockets contain aerogel material. In some embodiments, a pocket contains a single aerogel monolith or fiber reinforced aerogel monolith. In some embodiments, a pocket may contain two or more distinct aerogel monoliths or fiber reinforced aerogel monoliths.

As shown in the embodiments of FIGS. 6 and 7, the aerogel material was confined to the cavities. In some embodiments, aerogel material may also be present in one or more other portions of the aerogel composite.

Figure 8:
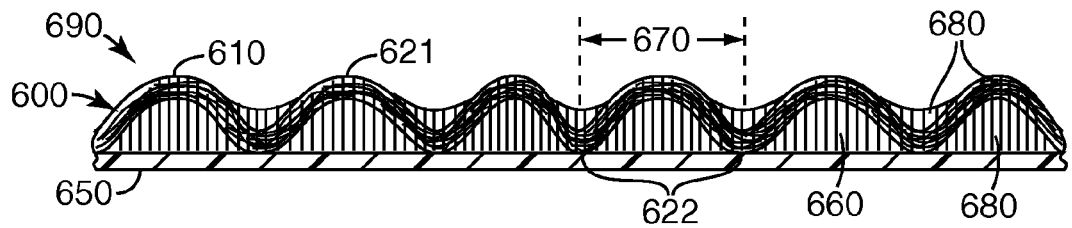
FIG. 8 illustrates a cross section of an aerogel composite according to some embodiments of the present disclosure, wherein aerogel material is embedded in the structured layer, on the surface of the structured layer, and within the cavities of the structured layer.

For example, referring to FIG. 8, aerogel composite 690 comprises aerogel throughout the entire structure. Specifically, aerogel composite 690 comprises structured layer 610 bonded to base layer 650, forming bonded web 600. Cavities 660 are bounded by base layer 650 and span 670 of structured layer 610, passing through at least one crest 621 between adjacent bonded troughs 622. Aerogel material 680 is present within cavities 660, and may be either an aerogel monolith or a fiber reinforced aerogel monolith. Additional aerogel material 680 is also embedded within structured layer 610.

As shown in FIG. 8, in some embodiments, aerogel material 680 may also be present on at least some of the exposed surface of structured layer 610. Although not shown, in some embodiments, aerogel material may also be present embedded within and/or located on the exposed surface of the base layer.

Figure 9:
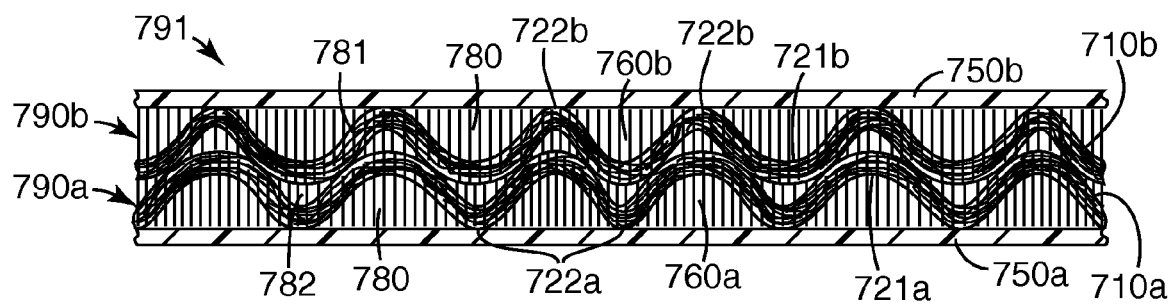
FIG. 9 illustrates a stacked aerogel composite article according to some embodiments of the present disclosure.

In some embodiments, two or more individual aerogel composites according to the present disclosure may be combined. For example, referring to FIG. 9, in some embodiments, first aerogel composite 790a and second aerogel composite 790b may be combined to form stacked aerogel composite 791. As shown in FIG. 9, adjacent aerogel composites may be stacked such that the structured layers are facing each other. In some embodiments, adjacent aerogel composites may be stacked such that the structured layer of one composite is facing the base layer of another composite layer. In some embodiments, adjacent aerogel composites may be stacked such that their base layers face each other. In stacks involving three or more individual aerogel composites, the relative orientations of the various adjacent aerogel composites may be independently selected.

Each of aerogel composites 790a and 790b comprise a structured layer (710a and 710b) bonded to a base layer (750a and 750b). Cavities 760a of aerogel composite 790a extend between adjacent bonded troughs 722a, while cavities 760b of aerogel composite 790b extend between adjacent bonded troughs 722b. As shown in FIG. 9, aerogel composite 790b has been inverted and offset relative to aerogel composite 790a, such that crests 721b of structured layer 710b generally align with troughs 722a of structured layer 710a. Similarly, crests 721a of structured layer 710a generally align with troughs 722b of structured layer 710b.

Aerogel material 780 is located within at least some, and in some embodiments, substantially all, of the cavities. In addition to being present with the cavities, in some embodiments, aerogel material may be present in one or more other regions of the aerogel composite. For example, in some embodiments, aerogel material 781 is also embedded within one or both of structured layers 710a and 710b. Additionally or alternatively, in some embodiments, aerogel material 782 may be present between structured layers 710a and 710b. Although not shown, additionally or alternatively, aerogel material may be embedded within and/or located on the exposed surface of one or both of base layers 750a and 750b.

In some embodiments, stacked aerogel composites may be formed by combining individual aerogel composites. In some embodiments, stacked aerogel composites may be formed by stacking bonded webs, and infusing the stack with aerogel precursor. The aerogel precursor can then be processed to form the final stacked aerogel composite. As described above, in some embodiments, adjacent bonded webs may be stacked such that the structured layer of one bonded web is facing the base layer of another bonded web. In some embodiments, adjacent bonded webs may be stacked such that their base layers face each other. In stacks involving three or more individual bonded webs, the relative orientations of the various adjacent bonded webs may be independently selected.

Regardless of how the stacked aerogel composite is formed, the spatial orientation of the crests and troughs of adjacent layers is not particularly limited. In some embodiments, the crests of one layer may be aligned with the crests of one or more adjacent layers. In some embodiments, the crests of one layer may be offset from the crests of one or more adjacent layers. For example, in some embodiments, the crests of one layer may be aligned with the troughs of an adjacent layer.

Generally, the base layer may comprise any known material. Exemplary materials include polymers, cellulose-based materials such as paper, inorganic materials (e.g., metal oxides), and metals (e.g., foils and scrims). Exemplary polymeric materials include polyolefins (e.g., polypropylene and polyethylene), polyesters, polyimides, and polycarbonates. In some embodiments, the base layer comprises extrudable material(s).

In some embodiments, the base layer comprises thermoplastic material(s). Thermoplastic materials are generally materials that flow when heated sufficiently above their glass transition temperature and become solid when cooled. Exemplary thermoplastic materials include polyolefins such as isotactic polypropylene, low density polyethylene, linear low density polyethylene, very low density polyethylene, medium density polyethylene, high density polyethylene, polybutylene, nonelastomeric polyolefin copolymers or terpolymers such as ethylene/propylene copolymer and blends thereof, ethylene-vinyl acetate copolymers such as those available under the trade designation ELVAX from E. I. DuPont de Nemours, Inc., Wilmington, Del.; ethylene acrylic acid copolymers; ethylene methacrylic acid copolymers such as those available under the trade designation SURLYN 1702 from E.I. DuPont de Nemours, Inc.; polymethylmethacrylate; polystyrene; ethylene vinyl alcohol; polyesters including amorphous polyester; polyamides; fluorinated thermoplastics such as polyvinylidene fluoride and fluorinated ethylene/propylene copolymers; halogenated thermoplastics such as chlorinated polyethylene; polyether-block-amides such as those available under the trade designation PEBAX 5533 from Elf-Atochem North America, Inc. Philadelphia, Pa.

In some embodiments, the base layer comprises a foam, e.g., open cell foams and closed cell foams. Exemplary foams include polyolefins, polyacrylics, polyisocyanurates, polyurethanes, polystyrenes, polyvinyl chlorides, polymethacrylimides, phenolics, polyimides, epoxies, vinyls, and the like, including combinations thereof. In some embodiments, syntactic foams may be used. In some embodiments, the foam may contain additives such as particulates and/or fibers.

In some embodiments, the base layer comprises a fibrous layer. The fibrous layer may be woven or non-woven. The non-woven substrates may be formed using any conventional non-woven fabric-forming process. Suitable non-woven substrates include, but are not limited to, spunbonded webs, spunlaced webs, meltblown webs, carded webs, needle-punched fabrics, hydroentangled fabrics, unidirectional fiber layer(s), meshes, or combinations thereof. In some embodiments, the non-woven substrate comprises a polypropylene non-woven web. In some embodiments, the fibers are unbonded (i.e., the fibers within the fibrous layer are not bonded to each other. In some embodiments, the fibrous layer is a bonded fibrous layer.

Generally, the fibrous layer may comprise natural fibers, synthetic fibers, or combinations thereof. Exemplary natural fibers include, but are not limited to, cotton fibers, viscose fibers, wood pulp fibers, cellulose-containing fibers, and combinations thereof. Exemplary synthetic fibers may be formed from any fiber-forming material including, but not limited to, polymeric materials including polyolefins such as polypropylene and polyethylene; polyesters such as polyethylene terephthalate and polybutylene terephthalate; polyamide (Nylon-6 and Nylon-6,6); polyurethanes; polybutene; polylactic acids; polyvinyl alcohol; polyphenylene sulfide; polysulfone; liquid crystalline polymers; polyethylene-co-vinylacetate; polyacrylonitrile; cyclic polyolefins; or any combination thereof. In one exemplary embodiment, the synthetic fibers comprise polypropylene fibers. In another exemplary embodiment, the synthetic fibers comprise polyester fibers.

The fibrous substrate may comprise monocomponent fibers comprising any one of the above-mentioned polymers or copolymers. Monocomponent fibers may contain additives as described below, but comprise a single fiber-forming material selected from the above-described polymeric materials. In some embodiments, the monocomponent fibers comprise at least 75 weight percent of any one of the above-described polymeric materials with up to 25 weight percent of one or more additives. In some embodiments, the monocomponent fibers comprise at least 80 weight percent, or at least 85 weight percent, or at least 90 weight percent, or at least 95 weight percent, and, in some embodiments, as much as 100 weight percent of any one of the above-described polymeric materials, wherein all weights are based on a total weight of the fiber.

The fibrous substrate may also comprise multi-component fibers formed from two or more of the above-described polymeric materials and, optionally, one or more additives as described below. As used herein, the term "multi-component fiber" is used to refer to a fiber formed from two or more polymeric materials. Suitable multi-component fiber configurations include, but are not limited to, a sheath-core configuration, a side-by-side configuration, and an "island-in-the-sea" configuration.

For non-woven substrates formed from multi-component fibers, in some embodiments, the multi-component fiber comprises from about 75 to about 99 weight percent of two or more of the above-described polymers and from about 25 to about 1 weight percent of one or more additional fiber-forming materials based on the total weight of the fiber.

The fibrous substrates may have a basis weight, which varies depending upon the particular end use of the article. In some embodiments, the fibrous substrate has a basis weight of less than 1000 grams per square meter (gsm). In some embodiments, the substrate has a basis weight of at least 1 gsm and, in some embodiments, at least about 10 gsm. In some embodiments, the basis weight is no greater than 500 gsm and, in some embodiments, no the greater than 150 gsm.

As with the basis weight, a fibrous substrate may have a thickness that varies depending upon the particular end use of the article. In some embodiments, the substrate has a thickness of no greater than 150 millimeters (mm), or no greater than 100 mm, or even no greater than 50 mm. In some embodiments, the substrate has a thickness of at least 0.5 mm, or at least 1 mm.

In most embodiments, the fibers within the substrate are substantially uniformly distributed within the non-woven substrate. However, there may be some embodiments wherein it is desirable to have a non-uniform distribution of fibers within the substrate.

Generally, the fibrous layer may be woven or non-woven. Generally, the fibers of the fibrous layer may be bonded or non-bonded. In some embodiments, the base layer may comprise a plurality layers.

Generally, the structured layer may comprise any known material, including, e.g., any of the materials described herein with respect to the base layer, including combinations thereof. For example, the structured layer may include one or more layers comprising one or more of a thermoplastic material, and a fibrous material (e.g., woven and non-woven webs, and bonded or non-bonded fibers). In some embodiments, the structured layer is permeable.

Depending, e.g., on the selection of materials for the structured layer and the base layer, in some embodiments at least one of the troughs of the structured layer are melt-bonded to the base layer. In some embodiments, e.g., when the structured layer and the base layer comprise thermoplastic layers, bonding can be accomplished using sonic welding or other means of applying heat and pressure to fuse the structured layer and the base layer at the desired bonding locations.

In some embodiments, at least one of the troughs of the structured layer is indirectly bonded to the base layer. For example, in some embodiments, a trough may be bonded to the base layer via an intervening adhesive layer. Any known adhesive may be used including, e.g., pressure sensitive adhesives, hot melt adhesives, and curable adhesives. In some embodiments, bonding may be accomplished using a thermoplastic adhesive layer, which may be softened by sonic energy or other means of applying heat and pressure to adhere the structured layer to the base layer at the desired bonding locations.

Generally, any known aerogel material may be used, including inorganic aerogels (e.g. silica, alumina, titania, zirconia, yttria, vanadia, and the like), organic aerogels (e.g., those made from polyacrylates, polystyrenes, polyacrylonitriles, polyurethanes, polyimides, epoxies, and the like), inorganic-organic hybrid aerogels, cross-linked aerogels, and combinations thereof.

Methods of making aerogels are well-known and generally include formation of an aerogel precursor, creating a gel from the precursor, and removing the liquid by, e.g., drying or supercritical extraction. In some embodiments, the aerogel materials may be treated to provide, e.g., hydrophobic, oleophobic, or hydrophilic aerogels. In some embodiments, optional additives such as dopants may be included to, e.g., reduce radiation.

In some embodiments, at least one of the base layer and the structured layer is permeable. For example, in some embodiments, at least one of the layers has sufficient porosity to permit an aerogel precursor to flow through the layer and at least partially fill the cavities. The precursor may then be gelled and the liquid removed resulting in aerogel material contained within the cavities. In some embodiments, aerogel material may also be present with one or both layers and/or on a surface of one or both layers as well.

In some embodiments, it may be desirable to have a covering film associated with the aerogel composite to, e.g., minimize damage to the aerogel and/or to prevent shedding. For example, in some embodiments, a film can provide as a protective covering to the aerogel composite. Generally, it is difficult to bond materials to the inorganic aerogel matrix or to aerogel coated fibers. However, in some embodiments of the present disclosure, the base layer and/or the structured layer can be bonded to one or more additional layers. For example, the base layer and/or the structured layer may be adhesively bonded, melt-bonded, or sonically welded to a variety of materials. Also, if a layer (e.g., the base layer and/or the structured layer) comprises a thermoplastic material, an additional thermoplastic layer (e.g., a film) can be melt-bonded to the base layer with the application of heat.

Figure 10:
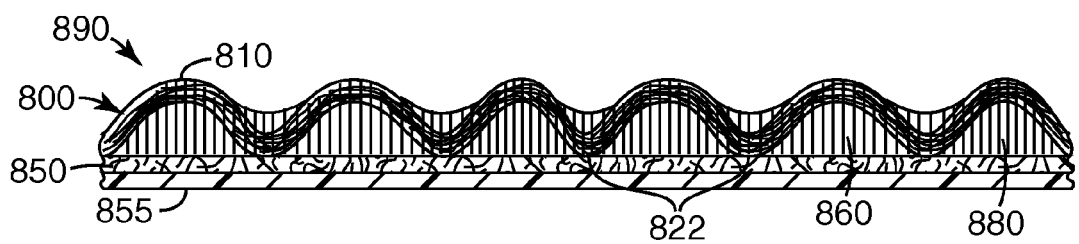
FIG. 10 illustrates an aerogel composite including an additional layer bonded to the base layer, according to some embodiments of the present disclosure.

Referring to FIG. 10, exemplary bonded aerogel composite 890 is shown. Bonded aerogel composite 890 includes bonded web 800, aerogel material 880, and additional layer 855. Bonded web 800 includes fibrous structured layer 810, which includes troughs 822 bonded to base layer 850. Aerogel material 880 is contained within cavities 860, as well as embedded in and present on both the fibrous structured layer and fibrous base layer 850, forming an aerogel composite. Additional layer 855 is bonded to base layer 850, forming bonded aerogel composite 890. In some embodiments, additional layer 855 helps contain aerogel material during handling to, e.g., reduce shedding of aerogel material.

In some embodiments, a stacked aerogel composite may comprise two or more individual bonded aerogel composites according to the present disclosure. In some embodiments, a stacked aerogel composite may be formed by combining one or more bonded aerogel composites, with one or more unbonded aerogel composites (i.e., an aerogel composite that does not include an additional layer bonded to the base layer or the structured layer). The number, order, and orientation of the layers is not limited, and may be selected according to various design considerations including, e.g., flexibility and handling. The bonded and unbonded aerogel composites of the present disclosure may also be combined with other aerogel materials, including other aerogel composites.

EXAMPLE 1

An Aerogel Composite

A bonded fibrous web was used as the flexible structured carrier for the aerogel. The bonded web was made per details presented in U.S. Pat. Nos. 6,537,935 and 5,888,607. A 75-25 blend of 3 denier (3 d) polyester (PET) fibers (Wellman Inc., Charlotte, N.C.)) and 6 d PET fibers (KoSa, Salisbury, N.C.) at 30 grams per square meter (gsm) was carded, corrugated and bonded to 30 gsm of polypropylene (PP) 7C05N strands (Dow Chemical Co., Midland, Mich.). The corrugating pattern resulted in approximately four bonded troughs per centimeter (ten bonded troughs per inch).

To make the aerogel precursor, 20.8 grams (g) of tetraethoxysilane (TEOS) was mixed with 13.8 g of 100% ethanol (200 proof) and 1.8 g of deionized water, resulting in a molar ratio of 1:3:1. Fourteen milliliters (ml) of 0.005 N HCl was added into the solution in sixty minutes at room temperature. Then, 5.6 ml of 0.05 N $NH_4OH$ was added to the solution.

This aerogel precursor was coated onto the bonded fibrous web. The coated web was allowed to gel overnight in an ethanol-vapor filled environment. The alcohol-gel was then aged in ethanol at 50 degrees Celsius for two days and allowed to cool to room temperature. The sample was then immersed in 100% ethanol (200 proof) three times to remove residual water.

The coated web was then supercritically dried to form the aerogel composite. First, the sample was weighed and placed in a stainless steel basket having an inside diameter (ID) of 2.2 centimeters (cm) (0.87 inches). This basket was placed inside of a 20 cm (8 inch) high stainless chamber having an ID of 2.5 cm (1 inch). The bottom and top of the chamber were fitted with metal frits and o-rings. This chamber was then inserted into a vessel rated to handle high pressures, i.e., 41,000 kilonewtons per square meter ($kN/m^2$) (6000 pounds per square inch (psi)). The outside of this vessel was heated by a jacket.

Carbon dioxide was chilled to less than −20 degrees Celsius and pumped with a piston pump at a flow rate of one liter per minute through the bottom of the unit. After ten minutes, the temperature of the unit was raised to 40 degrees Celsius at a pressure of 10,300 $kN/m^2$ (1500 psi). The drying process was conducted for a minimum of 24 hours. After the drying period, the carbon dioxide flow was ceased and the pressure was bled off at a rate of around 2000 $kN/m^2$ (300 psi per hour). When the pressure was at 377 kN/m2 (55 psi) or lower, the now dry samples of the final aerogel composite were removed and weighed.

The resulting aerogel composite was flexed and the aerogel material cracks. However, monolithic aerogel material remained encapsulated within the cavities between the arcuate portions of the structured layer and the base layer. In some embodiments, cracking occurs primarily near the interface between the aerogel material and the structured layer or the base layer. In some embodiments, cracking occurs primarily near the bond lines between the structured layer and the base layer. In some embodiments, some cracking also occurs in the bulk of the monolith.

The thermal conductivity of the aerogel composite was measured at a mean temperature of 12.5 degrees Celsius using a LASERCOMP Fox200 HEAT FLOW INSTRUMENT. The measured thermal conductivity ranged between 20-23 milliwatts per meter Kelvin (mW/mK).

EXAMPLE 2

A Stacked Aerogel Composite

The bonded fibrous web of Example 1 was coated and sandwiched with another layer of the bonded fibrous web with arcuate portions of each layer facing each other. The stacked sample was then super-critically dried as described in Example 1. The thermal conductivity of the stacked aerogel composite ranged between 23-26 milliwatts per meter Kelvin (mW/mK).

EXAMPLE 3

A Bonded Aerogel Composite

The aerogel composite of Example 1 was bonded to a cast polypropylene film as follows. A hand held laboratory heat gun (Master Appliance Model: HG-751 B) was held about 5 cm (about 2 inches) above the polypropylene strand side of the sample for 10 seconds at the highest heat setting. The cast polypropylene film was then placed onto the strands and gently pressed. The resulting laminate was allowed to cool. A strong bond was obtained between the polypropylene strands and the cast polypropylene film.

The aerogel composites of the present disclosure may used in a wide variety of applications, including those requiring thermal and/or acoustic insulation. For example, in some embodiments, an aerogel composite of the present disclosure may be applied to a surface of an article to serve as, e.g., a thermal insulation layer. In some embodiments, an aerogel composite of the present disclosure may serve as a thermal insulation layer for pipes, walls, containers, and the like.

Various modifications and alterations of this invention will become apparent to those skilled in the art without departing from the scope and spirit of this invention.

What is claimed is:

1. An aerogel composite comprising
    a bonded web comprising a base layer and a structured layer comprising a plurality of troughs, wherein
        at least some of the troughs are bonded to the base layer defining cavities between the structured layer and the base layer, and
        at least one of the base layer and the structured layer are permeable; wherein the base layer comprises a foam or a fibrous layer; and
    monolithic aerogel material contained within at least some of the cavities, further wherein the aerogel material fills at least 25% of the cross section of the cavity.

2. The aerogel composite of claim 1, wherein the base layer is permeable.

3. The aerogel composite of claim 1, wherein the base layer comprises a thermoplastic material.

4. The aerogel composite of claim 1, wherein the base layer comprises a plurality of layers.

5. The aerogel composite of claim 1, wherein the structured layer is permeable.

6. The aerogel composite of claim 1, wherein the structured layer comprises a thermoplastic material.

7. The aerogel composite of claim 1, wherein the structured layer comprises a fibrous layer.

8. The aerogel composite of claim 7, wherein the fibrous layer of the structured layer is non-woven.

9. The aerogel composite of claim 1, wherein at least some of the troughs of the structured layer are melt-bonded to the base layer.

10. The aerogel composite of claim 1, further comprising an adhesive bonding at least some of the troughs of the structured layer to the base layer.

11. The aerogel composite of claim 1, wherein a span of the structured layer between adjacent troughs is arcuate.

12. The aerogel composite of claim 1, wherein at least one cavity is a channel.

13. The aerogel composite of claim 1, wherein at least one cavity is a pocket.

14. The aerogel composite of claim 1, wherein monolithic aerogel material is contained within at least 90% of the cavities.

15. The aerogel composite of claim 1, wherein the monolithic aerogel material within at least one cavity comprises a fiber reinforced aerogel monolith.

16. The aerogel composite of claim 1, wherein the aerogel material comprises an inorganic aerogel.

17. The aerogel composite of claim 16, wherein the inorganic aerogel comprises silica.

18. The aerogel composite of claim 1, wherein the aerogel material comprises an organic aerogel.

19. The aerogel composite of claim 1, wherein the aerogel material comprises an inorganic-organic hybrid aerogel.

20. The aerogel composite of claim 1, wherein the aerogel material is hydrophobic.

21. The aerogel composite of claim 1, wherein the aerogel material is hydrophilic.

22. The aerogel composite of claim 1, further comprising aerogel material embedded within the structured layer.

23. The aerogel composite of claim 1, further comprising aerogel material embedded within the base layer.

24. The aerogel composite of claim 1, further comprising aerogel material on an exposed surface of the structured layer.

25. The aerogel composite of claim 1, further comprising aerogel material on an exposed surface of the base layer.

26. The aerogel composite of claim 1, further comprising an additional layer bonded to the base layer.

27. The aerogel composite of claim 26, wherein the additional layer comprises a thermoplastic material.

28. The aerogel composite of claim 27, wherein the additional layer is melt-bonded to the base layer.

29. The aerogel composite of claim 1, further comprising an additional layer bonded to the structured layer.

30. The aerogel composite of claim 29, wherein the additional layer comprises a thermoplastic material.

31. The aerogel composite of claim 30, wherein the additional layer is melt-bonded to the structured layer.

32. An aerogel composite comprising
    a bonded web comprising a thermoplastic base layer and a fibrous structured layer comprising a plurality of troughs, wherein at least some of the troughs are bonded to the base layer defining cavities between the structured layer and the base layer; and
    monolithic aerogel material contained within at least some of the cavities, further wherein the aerogel material fills at least 25% of the cross section of the cavity.

33. The aerogel composite of claim 32, wherein monolithic aerogel material is contained within at least 90% of the cavities.

34. The aerogel composite of claim 32, wherein the monolithic aerogel material comprises silica.

35. The aerogel composite of claim 32, further comprising aerogel material embedded within the structured layer, embedded within the base layer, on an exposed surface of the structured layer, on an exposed surface of the base layer, or combinations thereof.

36. The aerogel composite of claim 32, further comprising an additional layer bonded to the base layer, the structured layer, or both.

37. A stack of aerogel composites comprising two or more individual aerogel composites, wherein each individual aerogel composite comprises a bonded web comprising a base layer and a structured layer comprising a plurality of troughs, wherein at least some of the troughs are bonded to the base layer defining cavities between the structured layer and the base layer, and at least one of the base layer and the structured layer are permeable, wherein the base layer comprises a thermoplastic material and the structured layer comprises a fibrous layer; and monolithic aerogel material contained within at least 90% of the cavities, further wherein the aerogel material fills at least 25% of the cross section of the cavity.

38. The stack of aerogel composites according to claim 37, wherein the monolithic aerogel material comprises silica.

39. The stack of aerogel composites according to claim 37, wherein at least one individual aerogel composite is a bonded aerogel composite.

40. The stack of aerogel composites according to claim 39, wherein each of the individual aerogel composites is a bonded aerogel composite.

* * * * *